United States Patent [19]

Tajima et al.

[11] Patent Number: 5,541,015
[45] Date of Patent: Jul. 30, 1996

[54] FUEL CELL USING A SEPARATE GAS COOLING METHOD

[75] Inventors: Osamu Tajima, Hyogo; Akira Hamada, Osaka; Junji Tanaka, deceased, late of Osaka, by Sadako Tanaka, legal representative; Yasunori Yoshimoto, Osaka; Keigo Miyai, Osaka; Nobuyoshi Nishizawa, Osaka; Masaru Tsutsumi, Hyogo; Tomotoshi Ikenaga, Osaka; Kunihiro Nakato, Nara; Kiyoshi Hori, Mie, all of Japan

[73] Assignee: Sanyo Electric Co., Ltd., Osaka, Japan

[21] Appl. No.: 342,925

[22] Filed: Nov. 21, 1994

Related U.S. Application Data

[63] Continuation-in-part of Ser. No. 185,178, Jan. 24, 1994, abandoned, which is a continuation of Ser. No. 906,763, Jun. 30, 1992, abandoned.

[30] Foreign Application Priority Data

May 12, 1992 [JP] Japan .................................. 4-119029
Oct. 7, 1993 [JP] Japan .................................. 5-251523

[51] Int. Cl.[6] .................................................. H01M 8/04
[52] U.S. Cl. .................... 429/26; 429/24; 429/35; 429/38; 429/39
[58] Field of Search ........................ 429/24, 26, 35, 429/38, 39; H01M 8/02, 22

[56] References Cited

U.S. PATENT DOCUMENTS 4,324,844  4/1982  Kothman ........................... 429/26
4,345,009  8/1982  Fahle et al. ........................ 429/37
4,980,247  12/1990 Nakajima .......................... 429/34

*Primary Examiner*—Kathryn Gorgos
*Attorney, Agent, or Firm*—Merchant, Gould, Smith, Edell, Welter & Schmidt, P.A.

[57] ABSTRACT

A fuel cell comprising a stack including a stack including a plurality of cell units and a plurality of gas separators and at least one cooling plate, one of the gas separator and the cooling plate being interposed between adjacent cell units, the fuel cell being characterized in that; each gas separator and the cooling plate, respectively, have oxidant gas channels on one of surfaces that opposes to have contact with one of electrode surfaces of the cell unit to as to flow an oxidant gas in a direction vertical to a direction of a cooling air flowing through the cooling plate; each gas separator and the cooling plate, respectively, have fuel gas channels, a fuel-gas-supply inner manifold for taking in a fuel gas, and a fuel-gas-exhaust inner manifold for releasing the fuel gas having passed through the fuel gas channels on the other surface that opposes to have contact with the other electrode surface of the cell unit so as to flow the fuel gas in a direction parallel to the direction of the cooling air flowing through the cooling plates; and an inlet of the fuel-gas-supply inner manifold and an outlet of the fuel-gas-exhaust inner manifold are formed so as to supply and release the fuel gas in a same direction of the oxidant gas flowing through the oxidant gas channels.

19 Claims, 11 Drawing Sheets

FUEL CELL USING A SEPARATE GAS COOLING METHOD

CROSS REFERENCE TO RELATED APPLICATIONS

The present application is a continuation-in-part of Ser. No. 08/185,178 filed Jan. 24, 1994, which is a continuation of Ser. No. 07/906,763, filed Jun. 30, 1992, both now abandoned.

BACKGROUND OF THE INVENTION (1) Field of the Invention

The present invention relates to a fuel cell, and particularly, to a fuel cell using a separate gas cooling method (SGC) allowing a reactant air and a cooling air to flow separately.

(2) Description of the Related Art

A fuel cell, which converts chemical energy of a fuel gas directly into electric energy, is expected to be an efficient electricity generator, and the study of phosphoric acid fuel cells (PAFCS), molten carbonate fuel cells (MCFCs), and solid oxide fuel cells (SOFCs) has been conducted actively.

The cell temperature rises during the operation due to the heat of reaction and it is necessary to cool the fuel cell for efficient electricity generation at an adequate temperature. Conventionally, cooling plates, each having a plurality of cooling air passages that extend in parallel in one direction, are interposed between cell units at regular intervals to form a cell stack, and the cooling air is supplied from the inlets of the cooling plates for heat exchange.

However, according to the above construction, the cooling air inlet is over-cooled when the low-temperature cooling air flows in, whereas a cooling air outlet is heated when the post-heat-exchange cooling air flows out. This produces a large temperature gradient between the cooling air inlet and outlet, and thus making it impossible to cool the fuel cell evenly. This results in an uneven cell temperature and hence causes deterioration of the cell characteristics deterioration.

To maintain an even cell temperature even, a modified cooling plate is proposed in Japanese Patent Publication No. 62-2430. As shown in FIG. 1, a plurality of cooling air passages are formed on the cooling plate, and each of which branches as it extends toward the cooling air outlet. That is to say, the width of the cooling air passage (the area on the cell having contact with the cooling air) is narrow at the inlet and readily becomes wider as it extends towards the outlet, so that the fuel cell will be cooled less at the inlet and more at the outlet.

However, this method is not effective in terms of efficiency in generating electricity for the following reason. Narrowing the width of the cooling air passage at the inlet causes a considerable pressure loss, and the pressure must be increased to fully supply the cooling air throughout the branched passages to the outlet, Since the fuel cell uses self-generated electricity to supply the cooling air, the more power used to supply the cooling air, the less the efficiency becomes in electricity generation.

SUMMARY OF THE INVENTION

Accordingly, the present invention has a primary object to provide a fuel cell that generates electricity efficiently while maintaining the cell temperature substantially even.

The present invention has another object to provide a hexahedron fuel cell which easily takes in and releases the fuel gas, reactant air, and cooling air by modifying their respective channels.

The above objects can be fulfilled by a fuel cell comprising a stack including a plurality of cell units and a plurality of gas separators and at least one cooling plate, where one of the gas separator and the cooling plate is interposed between adjacent cell units, the fuel cell being characterized in that; each gas separator and the cooling plate respectively have oxidant gas channels on one of surfaces that opposes to have contact within one of the electrode surfaces of the cell unit so as to flow an oxidant gas in a direction perpendicular to a direction of a cooling air flowing through the cooling plate; each gas separator and the cooling plate, respectively, have fuel gas channels, a fuel-gas-supply inner manifold for taking in a fuel gas, and a fuel-gas-exhaust inner manifold for releasing the fuel gas having passed through the fuel gas channels on the other surface that opposes to have contact with the other electrode surface of the cell unit so as to flow the fuel gas in a direction parallel to the direction of the cooling air flowing through the cooling plates; and an inlet of the fuel-gas-supply inner manifold and an outlet of the fuel-gas-exhaust inner manifold are formed so as to supply and release the fuel gas in a same direction of the oxidant gas flowing through the oxidant gas channels.

In general, the temperature at the cooling air supplying side drops more than necessary when the cooling air for the hear exchange flows in, while the temperature at the cooling air exhaust side increases more than necessary when the post-heat-exchange cooling air flows out. Such a problem is eliminated by the above structure: the cooling air channel and fuel gas channel are made in parallel, and the upper streams of both the channels are located in the same side. This allows the fuel gas and cooling air to flow in the same direction, yielding a great amount of reaction heat at the upper stream and increasing the temperature at the cooling air inlet which otherwise would be over cooled. Naturally, the lower streams of both the channels are located in the same side.

Since the post-reaction fuel gas flowing downstream contains less hydrogen, the fuel gas and cooling air do not react as actively as in the upper stream. By curbing the reaction at the lower stream, the rise of the temperature can be reduced at the outlet where otherwise the temperature would increase more than necessary.

As a consequent, the fuel cell of the present invention has a small temperature gradient between the cooling air inlet and outlet, making it possible to maintain a substantially even cell temperature.

DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

First Embodiment

Figure 1:
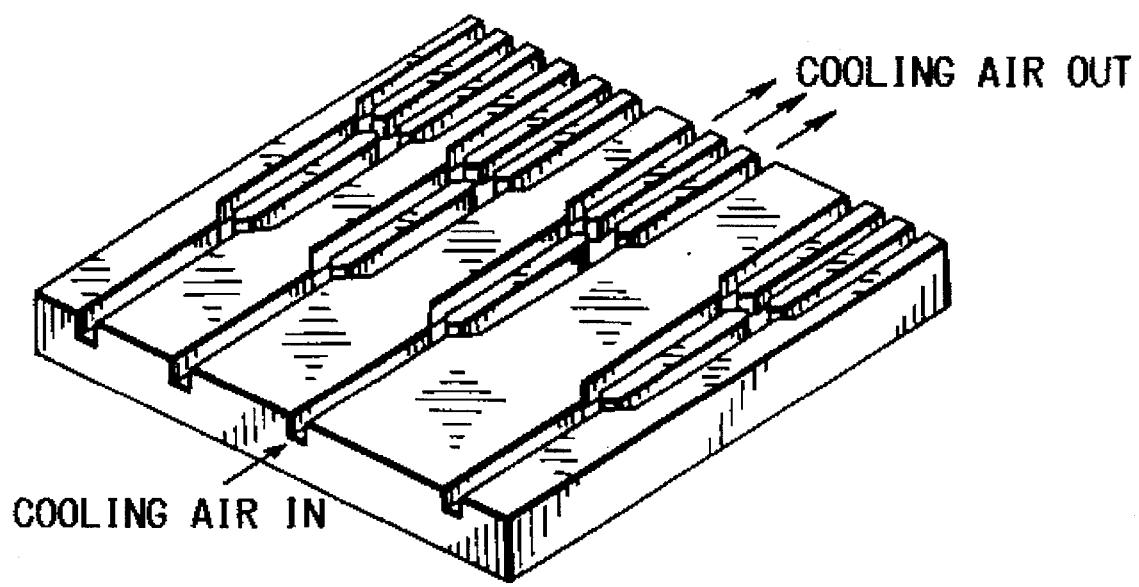
FIG. 1 is a perspective view of a conventional cooling plate.
Figure 2:
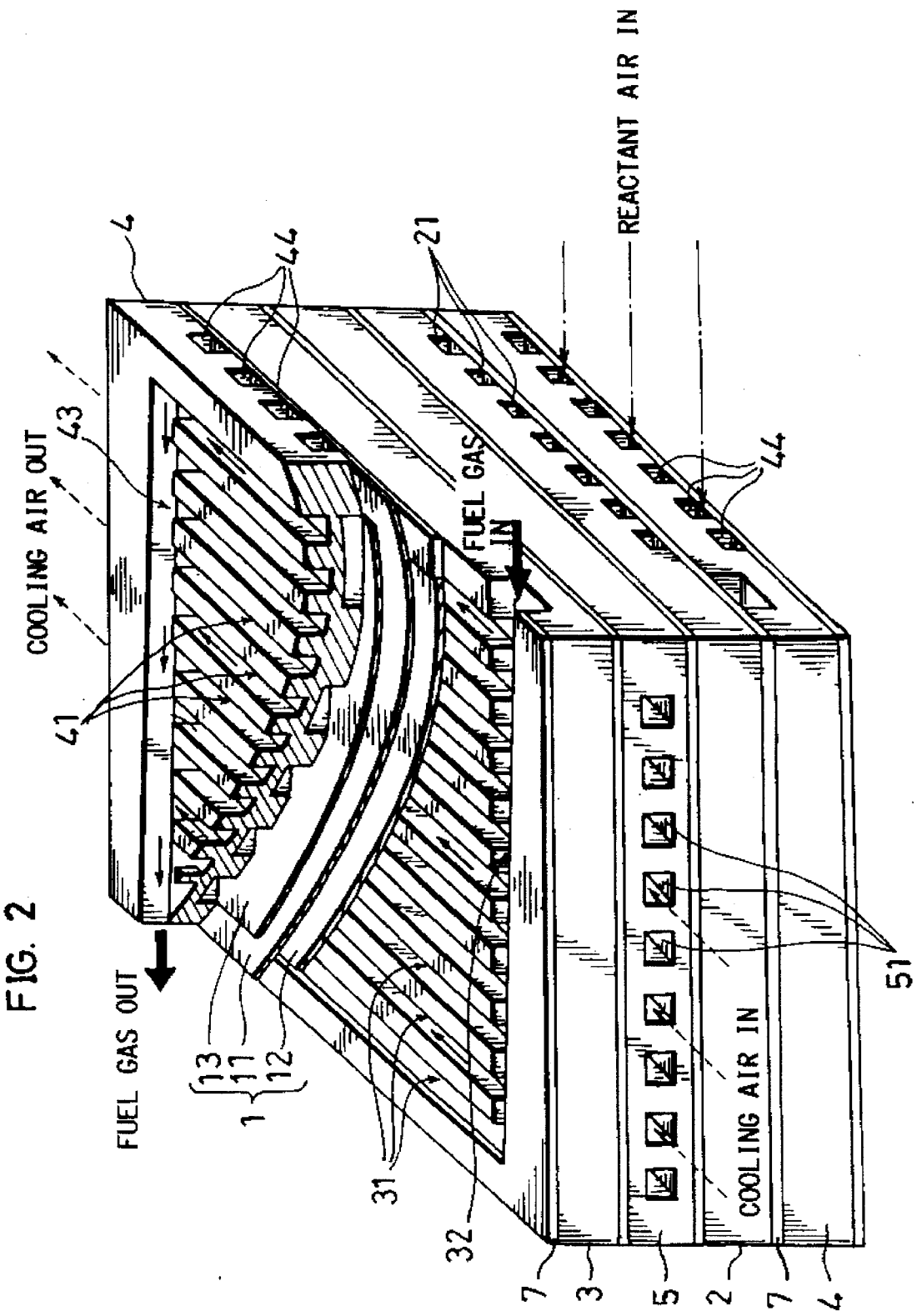
FIG. 2 is a cross section of the main part of a phosphoric acid fuel cell in accordance with a first embodiment of the present invention.

A phosphoric acid fuel cell, in the first embodiment is a lamination called a stack, comprising a plurality of cell units 1 and a plurality of gas separators, or namely half plates 2 and 3 and bi-polar plates 4. FIG. 2 shows a part of the stack. In the drawing, the cell unit 1, bi-polar plate 4, a cooling plate 5, the half plate 3, the cell unit 1, and bi-polar plate 4 are vertically layered from bottom to top. The fuel cell in effect is assembled by sandwiching the partial stack in FIG. 2 with the alternately layered cell units 1 and bi-polar plates 4 while interposing the cooling plates sandwiched by the half plates 2 and 3 at certain intervals. Either the half plate 2 or 3 is placed at the top and bottom ends.

The cell unit 1, for example, comprises a phosphoric-acid-impregnated electrolyte matrix 11 made of silicon carbide sandwiched by an anode 12 and a cathode 13. Both the electrodes are made of a carbon paper press-adhered to a catalyst layer which is made by binding carbon powders that loads platinum catalyst with fluororesin.

The half plates 2 supply a reactant air to the cell units 1, while the half plates 3 supply a fuel gas to the cell units 1. The bi-polar plates 4 supply the reactant air to the cells placed underneath, while supplying the fuel gas to the cell units 1 placed above. The upper surface of the half plate 2 is plain while reactant air channels 21 are formed on the lower surface. As shown in FIG. 2, all the reactant air channels 21 are formed across the lower surface.

As shown in FIG. 2, the lower surface of the half plate 3 is plain while fuel gas channels 31, a fuel-gas-supply inner manifold 32, and a fuel-gas-exhaust inner manifold (not shown) are formed on the upper surface.

Both of the inner manifolds are concavities having communication with the fuel gas channels 31. To allow the fuel gas to flow evenly through the fuel gas channels 31, the fuel-gas-supply internal manifold 32 is made narrower in proportion to the distance from the fuel gas inlet, and a fuel-gas-exhaust internal manifold 33 (not shown) wider in reverse proportion to the distance from the fuel gas outlet. However, note that the width of both the inner manifolds may be constant regardless of the distance from the fuel gas inlet and fuel gas outlet.

As shown in FIG. 2, reactant air channels 44 are formed on the lower surface of each bi-polar plate 4 in the same manner as the half plate 2, while fuel gas channels 41, a fuel-gas-supply inner manifold 42 (not shown), and a fuel-gas-exhaust inner manifold 43 are formed on the upper surface in the same manner as the half plate 3.

It is apparent from FIG. 2, that cooling air channels 51 are made through the cooling plate 5 in the middle with respect to the thickness of the plate. The cooling air is supplied from the same power source as the reactant air, and the supply of the cooling air is controlled in such a manner that the temperature of the lower stream of the cooling air is maintained at approximately 200° C. during the operation. However, the cooling air and reactant air may have different air supply sources.

Numeral 7 in FIG. 2 denotes a sealing member for separating the fuel gas and reactant air.

Figure 3:
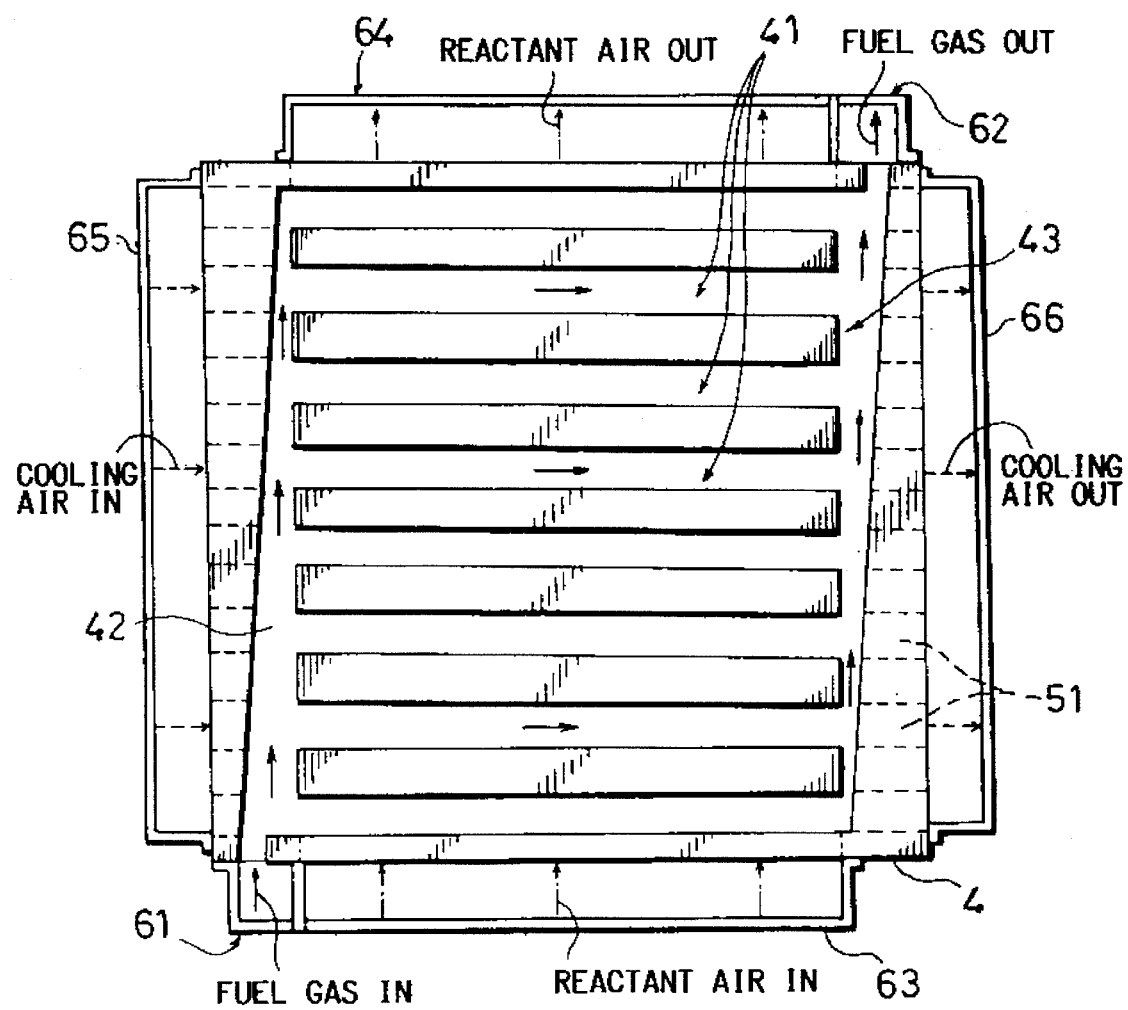
FIG. 3 is a top view of FIG. 2.

As shown in FIG. 3, a fuel-gas-supply external manifold 61, a fuel-gas-exhaust external manifold 62, a reactant-air-supply external manifold 63, a reactant-air-exhaust external manifold 64, a cooling-air-supply external manifold 65, and a cooling-air-exhaust external manifold 66 are separately attached to the four side surfaces of the fuel cell.

The flow of the fuel gas, reactant air, and cooling air in the fuel cell in the first embodiment will be described while referring to FIGS. 2 and 3; in the drawings, a sold line refers to a fuel gas flow, a short dashed line to a cooling air flow, and a chain line to a reactant air flow.

The fuel gas supplied from the fuel-gas-supply external manifold 61 through the fuel-gas-supply inner manifolds 32 and 42 flows evenly through the fuel gas channels 31 and 41 while passing through the anodes 12, and is exhausted from the fuel-gas-exhaust external manifold 62 through the fuel-gas-exhaust internal manifolds in half plate 3 and bipolar plate 4. The reactant air supplied from the reactant-air-supply external manifold 63 flows evenly through the reactant air channels 21 and 44, which are oriented in a direction perpendicular to the fuel gas channels 3I and 41, while passing through the cathodes 13, and is exhausted from the reactant-air-supply external manifold 64. The fuel gas thus supplied to the anodes 12 reacts with the reactant air thus supplied to the cathodes 13, causing the cell units 1 to generate electricity.

At the fuel gas inlet, the fuel gas including a relatively high concentration of hydrogen and low concentration of carbon monoxide is supplied and the fuel gas and reactant air react actively, producing a great amount of heat of reaction. As a result, the temperature of the upstream side rises. Whereas at the fuel gas outlet, the fuel gas including a relatively low concentration of hydrogen and high concentration of carbon monoxide is supplied, and the fuel gas and reactant air do not react as actively as at the upstream side, producing little amount of heat of reaction. The cooling air supplied from the cooling-air-supply external manifold 65 flows evenly through the cooling air channels 51 in the cooling plate 5 and is exhausted from the cooling-air-exhaust manifold 66.

In general, the temperature at the cooling air supplying side drops more than necessary when the cooling air flows in, while the temperature at the cooling air exhaust side increases more than necessary when the post-heat-exchange cooling air flows out. To eliminate this problem, the upstream and downstream sides of the fuel gas channels 31 and 41 are placed on the upstream and downstream sides of the cooling air channels 51, respectively. Being so constructed, the great amount of the heat of reaction in the upstream side of the fuel gas channels 31 and 41 is transferred to the cooling air, while little amount of the heat of reaction is transferred to the post-heat-exchange cooling air at the downstream side of the fuel gas channels 31 and 41.

Consequently, the temperature gradient between the fuel gas inlet and outlet is reduced, and the cell temperature becomes substantially even.

Using a reformed gas ($H_2/CO_2/CO$ Mixed gas), in particular, makes it easy to maintain the temperature at the outlet of the fuel gas at approximately 200° C., at which the harm to the electrode catalyst by CO poisoning can be minimized.

Note that although the phosphoric acid fuel cell is used in this embodiment, molten carbonate fuel cells, solid oxide fuel cells, or polymer electrolyte fuel cells can be used as well.

Second Embodiment

Figure 4:
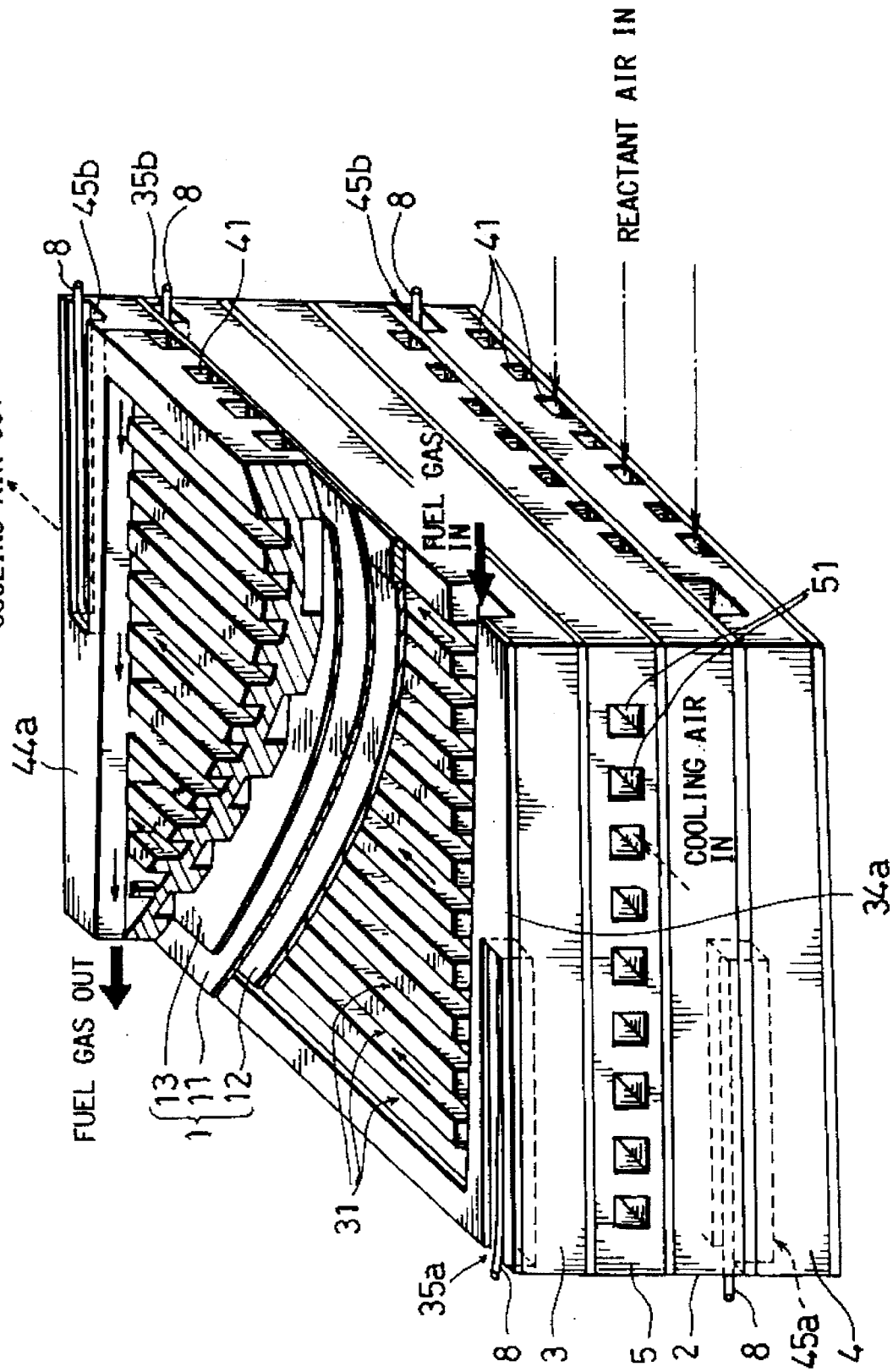
FIG. 4 is a cross section of the main part of a phosphoric acid fuel cell in accordance with a second embodiment of the present invention.
Figure 5:
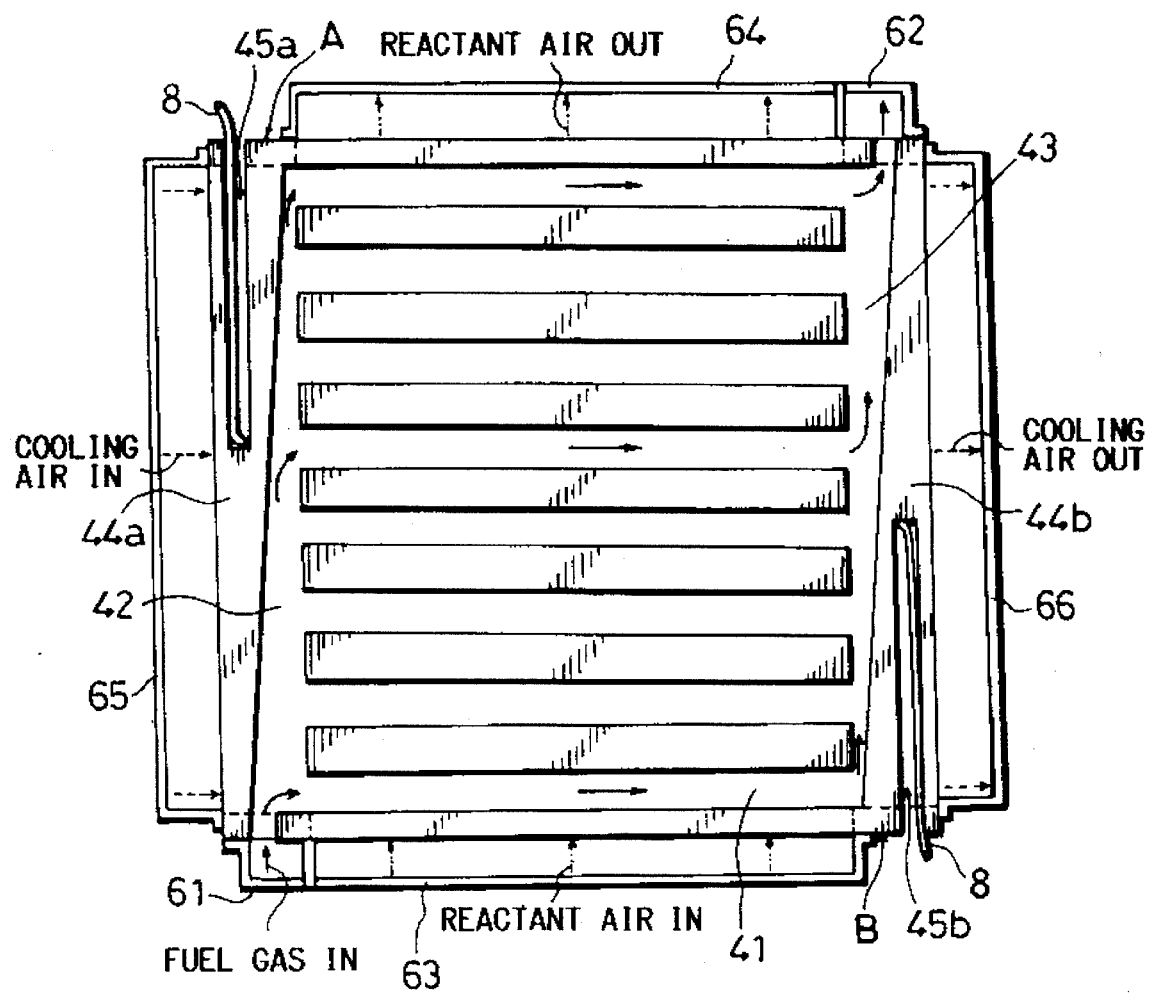
FIG. 5 is a top view of FIG. 4.
Figure 6:
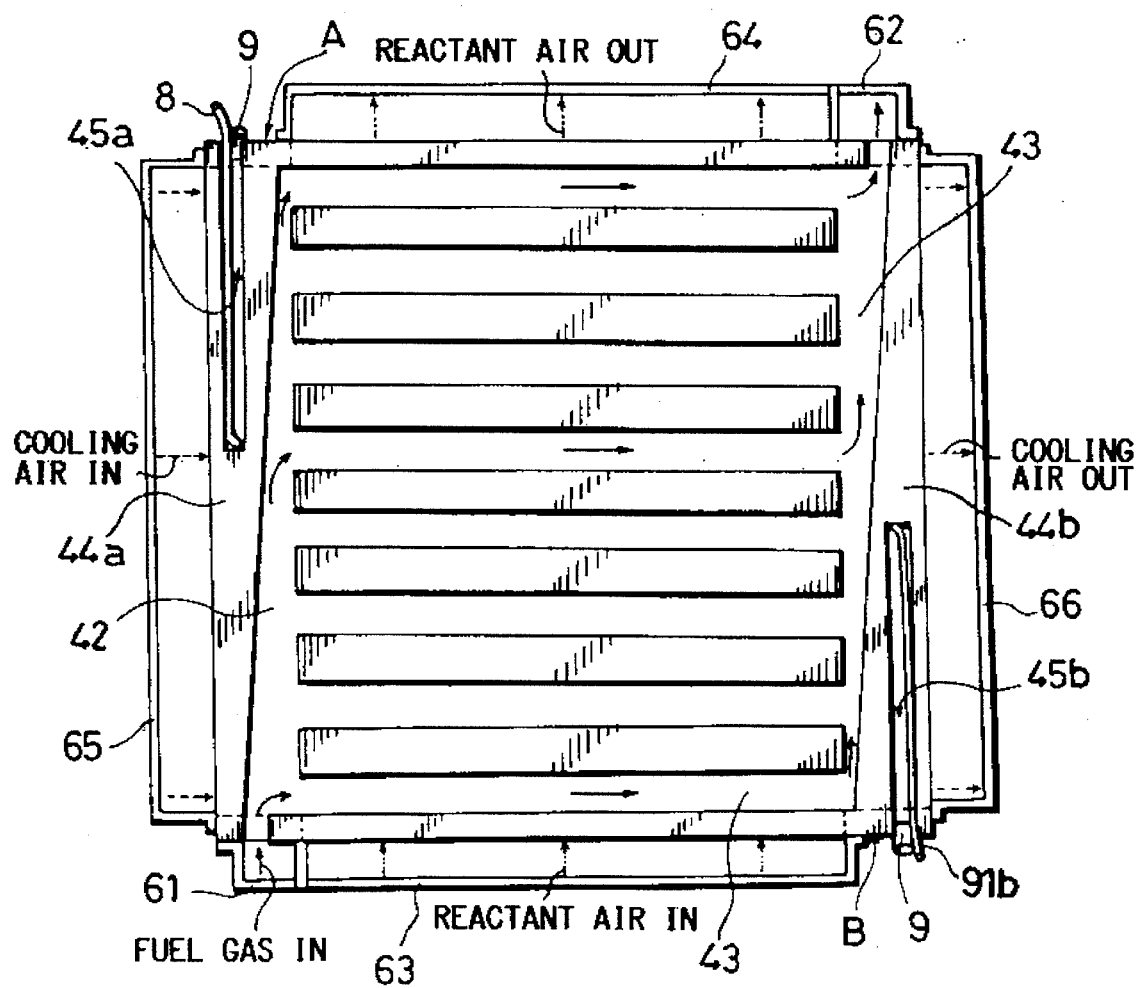
FIG. 6 is another top view of FIG. 4.

As shown in FIGS. 4 and 5, a phosphoric acid fuel cell of the second embodiment is of the same construction as the first embodiment except that reservoirs 35a, 35b, 45a, and 45b, are formed at the upper edges of the half plate 3 and bi-polar plates 4 for reserving electrolyte, and that pipes 8 are inserted into each reservoir for supplying phosphoric acid. Hereinafter, like components are labeled with like reference numerals with respect to the first embodiment, and the description of these components is not repeated. Each of the reservoirs 35a, 35b, 45a, and 45b reserves phosphoric acid for replenishment to the electrolyte matrixes 11 and also reserves overflow phosphoric acid from the electrolyte matrixes 11 due to a change in temperature. As shown in FIG. 5, each reservoir has the opening and the closing; the former is formed at the side surface A or B, neither of which is covered with the fuel-gas-supply external manifold 61, fuel-gas-exhaust external manifold 62, reactant-air-supply external manifold 63, reactant-air-exhaust external manifold 64, cooling-air-supply external manifold 65, and the cooling-air-exhaust external manifold 66, and the latter is formed inside the edge. The pipes 8 are exposed from the opening of the reservoirs 31a, 35b, 45a, and 45b at one end while the other end is extended to the closing. A stopper 9 (shown in FIG. 6) furnished for each pipe 8 prevents air from entering into the fuel cell when not in use.

In the following, how the electrolyte is replenished to the electrolyte matrixes 11 will be explained by using the half plate 3 as an example.

The stoppers 9 at the opening of the reservoirs 35a and 35b are removed and the needles of syringes filled with phosphoric acid are inserted into the openings of the pipes 8 sticking out from the openings of the reservoirs 35a and 35b, and the reservoirs 35a and 35b, which are formed respectively at edge seals 34a and 34b (not shown) are gradually filled with phosphoric acid to their full, Replenished phosphoric acid from the reservoirs 35a and 35b penetrates through the electrolyte matrix 11 placed above from the two edges having contact with the reservoirs 35a or 35b.

Phosphoric acid is replenished to the other electrolyte matrix 11 in the same manner using the reservoirs 45a and 45b, and the pipes 8 in the bi-polar plate 4.

By forming several reservoirs and pipes as above, the amount of the replenishing phosphoric acid for each electrolyte matrix 11 can be adjusted.

In addition, even if unconsumed gas remains in the reservoirs, it can be released by filling the reservoirs with phosphoric acid, obviating a gas outlet in the fuel cell (external manifolds). Since it is no longer necessary to remove the external manifolds, the electrolyte can be replenished easily.

Note that the pipes 8 are not necessarily inserted in the reservoirs; the phosphoric acid can be replenished by inserting elongate needles such as those of syringes to the openings each time the electrolyte is replenished.

Also, bond can be used as the stoppers 9.

Although two reservoirs are formed for each half plate and bi-polar plate, only one reservoir may be formed.

Each reservoir is approximately half the length of one side of the bi-polar plate or half plate; however, the reservoir may be longer than half the length and shorter than the one side.

Third Embodiment

Figure 7:
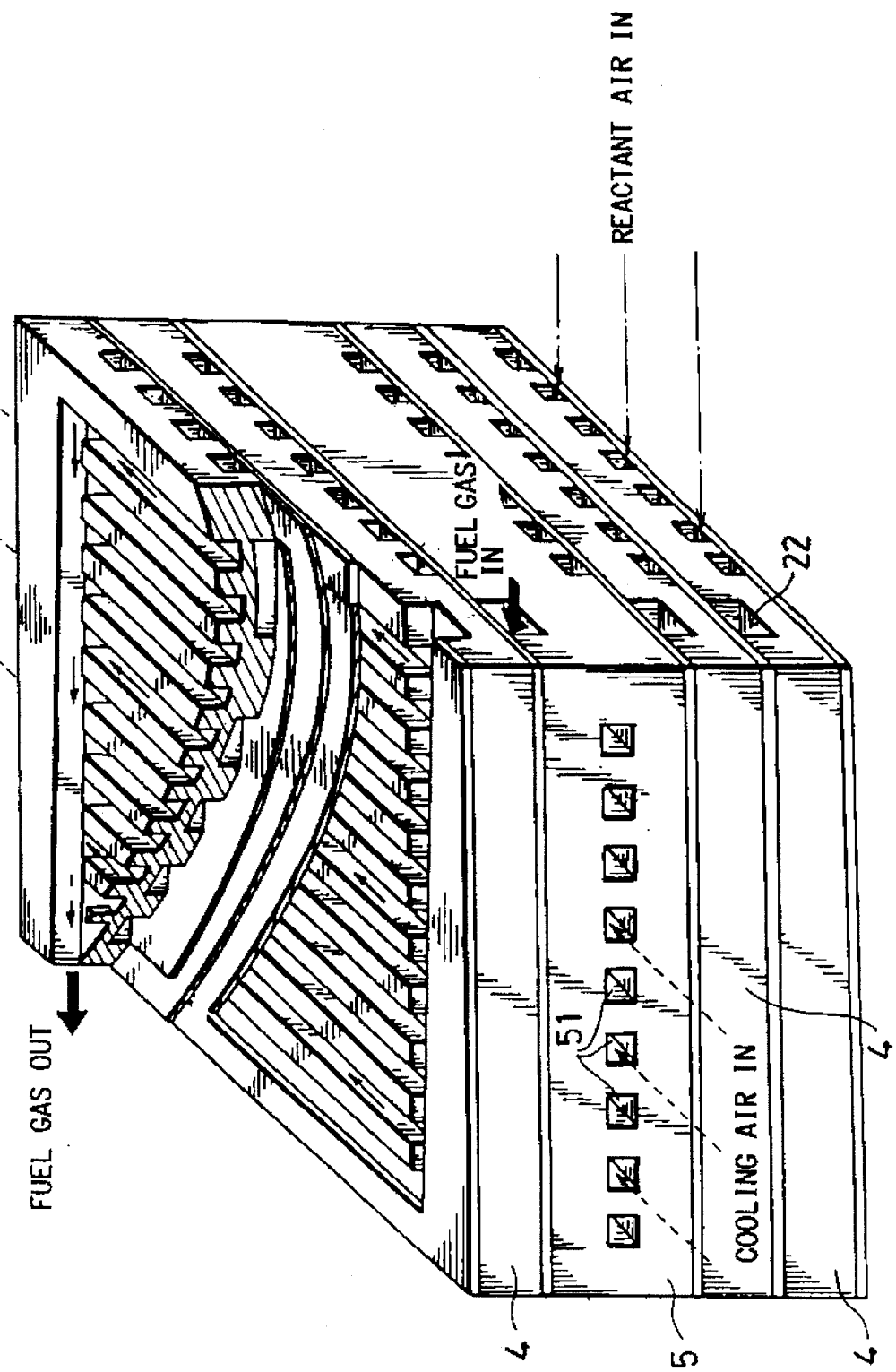
FIG. 7 is a perspective partly broken view of a phosphoric acid fuel cell in accordance with a third embodiment of the present invention.

FIG. 7 shows a phosphoric acid fuel cell in accordance with the third embodiment of the present invention. Hereinafter, like components are labeled with like reference numerals with respect to the first embodiment, and the description of these components is not repeated. The differences between the first and third embodiments are: a plurality of bi-polar plates 4 are used instead of the half plates 2 and 3; and the cooling plate 5 has certain channels and the inner manifolds on both the main surfaces in the same manner as the bi-polar plate 4.

Figure 8:
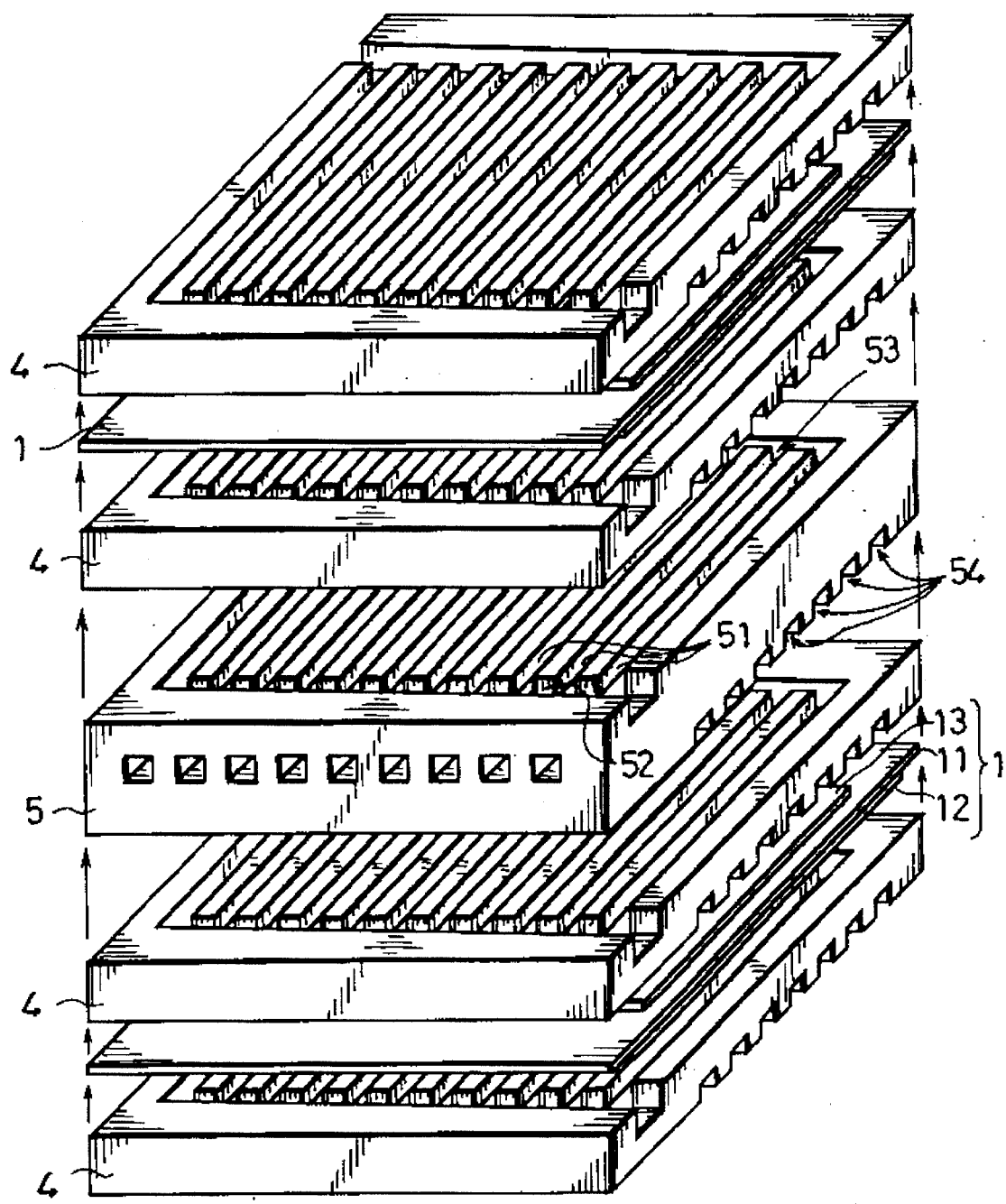
FIG. 8 is a perspective exploded view of the fuel cell in the third embodiment.

FIG. 8 depicts the structure of the cooling plate 5. It is obvious from FIG. 8 that, like the bi-polar plates 4 the fuel gas channels 51, fuel-gas-supply inner manifold 52, and fuel-gas-exhaust inner manifold 53 are formed on the upper surface of the cooling plate 5, and the reactant air channels 54 are formed on the lower surface.

One cell unit 1 is interpolated between two bi-polar plates 4, and also between the bi-polar plate 4 and cooling plate 5.

Although it is not shown in the drawing, the external manifolds for supplying and exhausting the cooling air, fuel gas, and reactant air are attached to the four side surfaces of the fuel cell in the same manner shown in FIG. 3. To be more specific, the cooling-air-supply external manifold 65 and cooling-air-exhaust external manifold 66 are attached at the two opposing side surfaces having the inlet and outlet of the cooling air channels, while the reactant-air-supply external manifold 63 and reactant-air-exhaust external manifold 64, and fuel-gas-supply external manifold 61 and fuel-gas-exhaust external manifold 62 are attached at the other two opposing side surfaces having the inlet of the fuel-gas-supply inner manifold and the outlet of the fuel-gas-exhaust inner manifold and the inlet and outlet of the reactant air channels 54.

Note that, although it is not shown in the drawing, the reservoirs are formed at the upper edges of the bi-polar plates 4 and cooling plate 5 and the pipes 8 are inserted into each reservoir for phosphoric acid replenishment.

Fourth Embodiment

Figure 9:
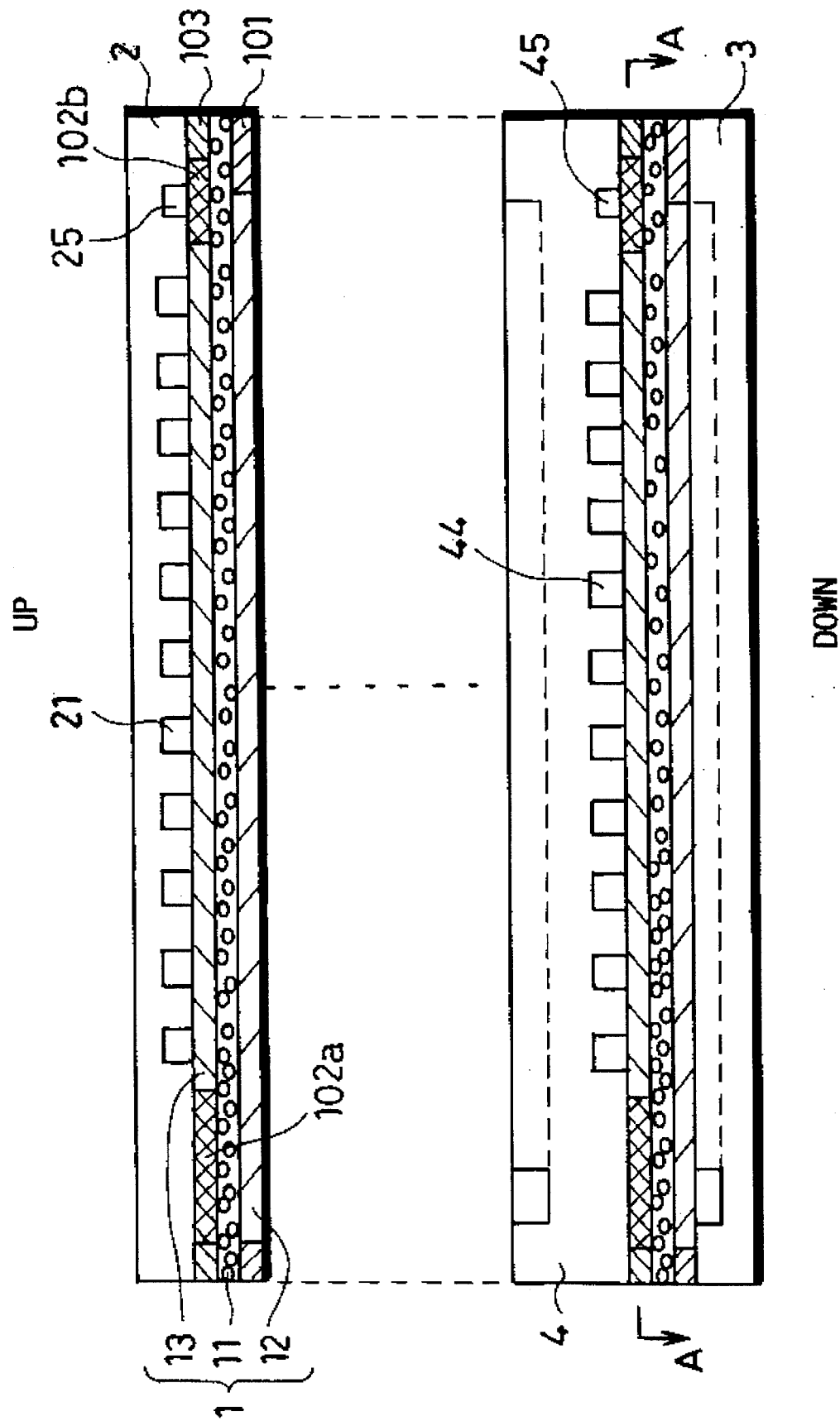
FIG. 9 is a cross sectional view of a phosphoric acid fuel cell in accordance with a fourth embodiment of the present invention.

FIG. 9 shows a phosphoric acid fuel cell in accordance with the fourth embodiment of the present invention. The fuel cell of this embodiment is characterized by the mechanism of the phosphoric acid electrolyte replenishing means. Hereinafter, like components are labeled with like reference numerals with respect to the first through third embodiments, and the description of these components is not repeated. As shown in FIG. 9, the cell units 1 and bi-polar plates 4 ere alternately layered, and the half plate 2 that has reactant air channels 21 on the lower surface is placed on the top, while the half plate 3 that has fuel gas channels 31 on the upper surface is placed at the bottom. The reservoirs 25 and 45 for replenishing the phosphoric acid electrolyte are formed at the lower edges of the half plate 3 and bi-polar plate respectively. Although the cooling plates are not shown in the drawing, they are interposed between the cell units 1 and bipolar plates 4 at certain intervals as was in the third embodiment.

Figure 10:
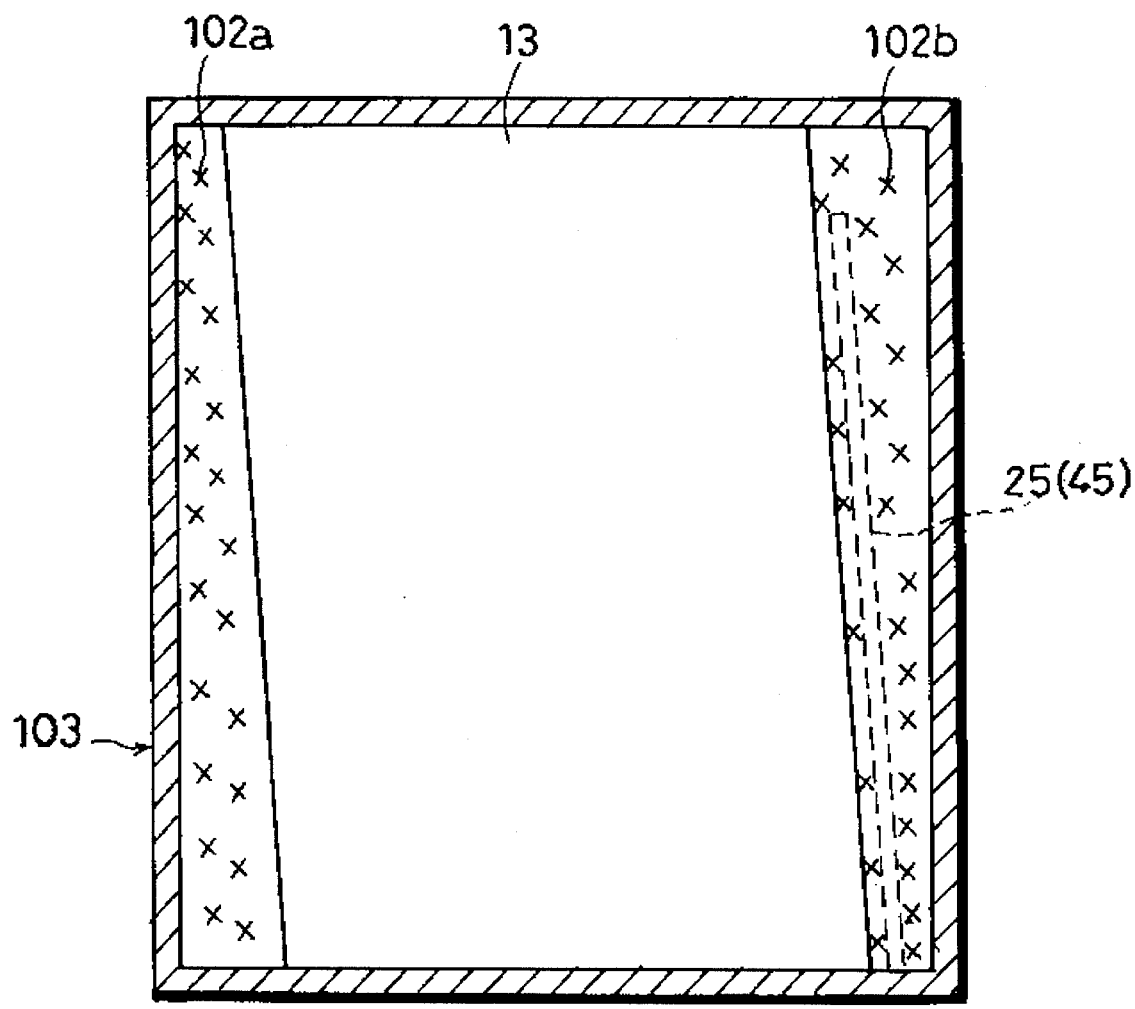
FIG. 10 is a traverse sectional view from the cathode along the line A—A of FIG. 9.

The reservoirs 25 and 45 are less deep than the reactant air channels 21 and 44, and as shown in FIG. 10, they are shorter than one side of the cathode 13.

To seal the gas inside, an anode shim 101 is placed around the circumference of the anode 12, or the space between the electrolyte matrix 11 and bi-polar plate 4 or half plate 2. Similarly, phosphoric acid holding members 102a and 102b and a cathode shim 103 are placed around the circumference of the cathode 13, or the space between the electrolyte matrix 11 and bi-polar plate 4 or half plate 3. The phosphoric acid holding member 102b is, for example, 0.4 mm thick, and completely covers the openings of the reservoirs 25 and 45 at one side while having contact with the electrolyte matrix at the other side. The phosphoric acid holding member 102a is placed at the edge seals where the reservoirs 25 and 45 are not formed, and both the phosphoric acid holding members 102a and 102b are made of the same material. Any material capable of holding the phosphoric acid electrolyte can be the phosphoric acid holding members 102a and 102b; however, such holding capability must be smaller than that of the electrolyte matrix 11. Carbon papers and fluororesin are typical used.

Figure 11:
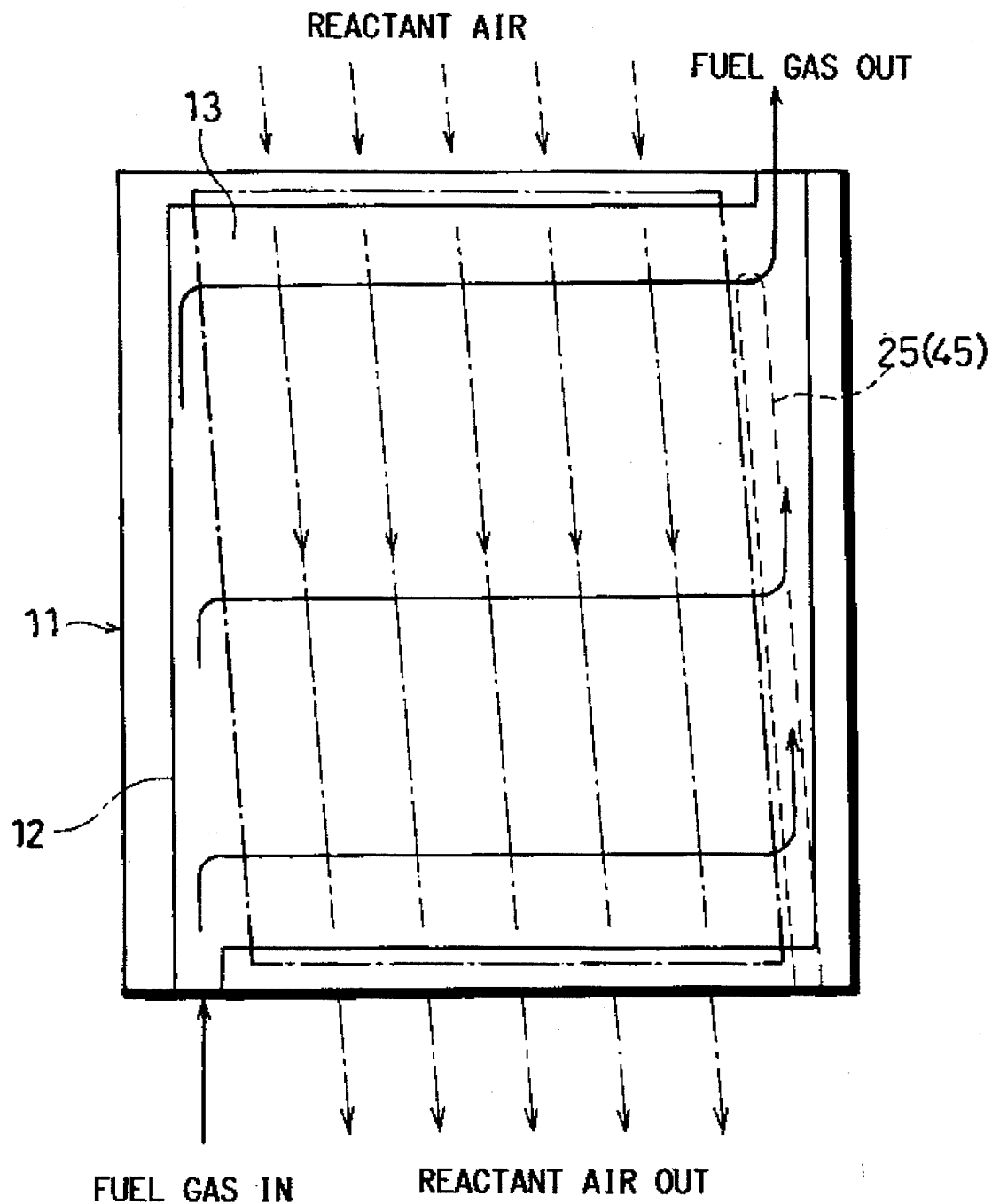
FIG. 11 is a plan view depicting a structure of the phosphoric acid fuel cell in the fourth embodiment.

FIG. 11 shows a schematic structure of the phosphoric acid cell in FIG. 9. Numeral 13 denotes the cathode (alternate long and short dashed line), numeral 11 denotes the electrolyte matrix, and numeral 12 denotes the anode (alternate long and short dashed line). Numerals 25 and 45 denote the reservoirs (solid line).

The cell unit 1 consists of the electrolyte matrix 11 (0.3 mm thick) made of silicon carbide sandwiched by the anode 12 (0.3 mm thick) and cathode 13 (0.4 mm thick). Both the electrodes are made of a carbon paper press-adhered to a catalyst layer which is made by binding carbon powders that loads platinum catalyst with fluororesin.

As shown in FIG. 11, the cathode gas (reactant air) flows in a direction perpendicular to a direction in which the anode gas (fuel gas) flows. The reservoirs 25 and 45 are extendedly formed in the edge seals where the cell temperature rises. Because the higher the temperature, more the phosphoric acid electrolyte in the electrolyte matrix 11 evaporates.

In the following, the explanation of how the phosphoric acid electrolyte is replenished will be given.

The anode 12 and cathode 13 react as follows. The electrolyte, or phosphoric acid solvent, is a strong electrolyte, and thus it dissociates to phosphoric acid ions and hydrogen ions ($H_3PO_4 \rightarrow H^+ + H_2PO_4^-$), playing a role of a good conductor for hydrogen ions generated at the anode 12 after the cell reaction.

At the anode 12, hydrogen reacts on the electrode surface and changes into hydrogen ions and electrons ($H_2 \rightarrow 2H^+ + 2e^-$), and hydrogen ions move towards the cathode 13 across the electrolyte matrix 11.

On the other hand, at the cathode 13, the hydrogen ions from the anode 12 and electrons from an external circuit react with oxygen supplied externally, and produce water ($\frac{1}{2}O_2 + 2H^+ 2e^- \rightarrow H_2O$).

In this way, as a result of the fuel cell reaction, water is produced and the cell units 1 yield heat. Accordingly, the cell temperature rises, and the phosphoric acid electrolyte impregnated in the electrolyte matrix 11 evaporates. Thus, the phosphoric acid electrolyte is replenished to the electrolyte matrix 11 through the reservoirs 25 and 45 every two or three thousands hours. The phosphoric acid electrolyte is replenished into the reservoirs 25 and 45 with a syringe or the like from the size surfaces of the stack. The replenished phosphoric acid electrolyte is subsequently impregnated into the phosphoric holding member 102b. Since the electrolyte holding capability of the phosphoric acid holding member 102b is smaller than that of the electrolyte matrix 11, when the phosphoric acid electrolyte is supplied more than necessary into the phosphoric holding member 102b, the excess phosphoric acid electrolyte is supplied into the electrolyte matrix 11 to be used for the cell reaction. Should all the phosphoric acid electrolyte be consumed from the reservoirs 25 and 45, the phosphoric acid electrolyte impregnated in the phosphoric holding member 102b is supplied to the electrolyte matrix 11.

As shown in FIG. 10, the phosphoric holding member 102a, made of the same material of the phosphoric acid holding member 102b, is formed at the edge seal where neither the reservoir 25 nor 45 is formed. Because it is preferable to incorporate the phosphoric acid holding member 102a filled with the phosphoric acid electrolyte into the fuel cell to prevent the electrolyte matrix 11 from being completely dried.

The phosphoric holding member 102b is made between the reservoir 25 or 45 and the electrolyte matrix 11; however, it may be formed within the reservoirs 25 and 45 in such a manner that it will have contact with the electrolyte matrix 11.

As shown in FIG. 10, the reservoirs 25 and 45 are diagonally formed along the edge of the cathode 13 to shorten the distance to the center of the cell unit 1; however, they may be formed straight.

Also, note that the reservoirs 25 and 45 can be additionally formed in the phosphoric acid holding member 102a as was in the second embodiment.

Although the present invention has been fully described by way of examples with reference to the accompanying drawings, it its to be noted that various changes and modifications will be apparent to those skilled in the art. Therefore, unless otherwise such changes and modifications depart from the scope of the present invention, they should be construed as being included therein.

What is claimed is:

1. A fuel cell in the form of a stack, comprising:

a plurality of cell units having first and second electrodes;

a gas separator plate; and a cooling plate having a plurality of cooling channels with cooling air inlets and cooling air outlets for carrying cooling air, extending through the cooling plate in a horizontal direction with respect to the stack wherein at least one of the gas separator plate and the cooling plate is disposed between adjacent cell units;

each of the gas separator plate and the cooling plate which is disposed adjacent one of the first electrodes of the cell units has a first surface that faces the first electrode and is provided with oxidant gas channels, the oxidant gas channels being oriented to permit oxidant gas to flow in a direction perpendicular to the direction of cooling air flowing through the cooling channels of the cooling plate;

each of the gas separator plate and the cooling plate which is disposed adjacent one of the second electrodes of the cell units has a second surface that faces the second electrode and is provided with fuel gas channels, a fuel gas-supply inner manifold for supplying fuel gas to the fuel gas channels and a fuel gas-exhaust inner manifold for releasing fuel gas from the fuel gas channels, the fuel gas channels being oriented to permit fuel gas to flow in a direction parallel to the direction of cooling air flowing through the cooling channels of the cooling plate; and the fuel gas-supply inner manifolds are disposed at a side of the plate corresponding to the side of the cooling air inlets and the fuel gas-exhaust inner manifolds are disposed at a side of the plate corresponding to the cooling air outlets.

2. The fuel cell of claim 1 wherein:

the stack is a hexahedron;

the inlet and the outlet of the cooling air channels in the cooling plate are formed on two opposed side surfaces excluding a top surface and a bottom surface, respectively, a cooling-air-supply external manifold being attached to the inlet side surface, a cooling-air-exhaust external manifold being attached to the outlet side surface; and an inlet and an outlet of the oxidant gas channels are formed on a part of each of the other two opposed side surfaces, respectively, and the inlet of the fuel-gas-supply inner manifold and the outlet of the fuel-gas-exhaust inner manifold being formed on a remaining part of each of the other two opposing side surfaces, respectively, each inlet and outlet being exposed from their respective side surfaces, an oxidant-gas-supply external manifold being attached to supply the oxidant gas to the inlet of the oxidant gas channels, an oxidant-gas-exhaust external manifold being attached to exhaust the oxidant gas from the Outlet of the oxidant gas channels, a fuel-gas-supply external manifold being attached to supply the fuel gas to the inlet of the fuel-gas-supply inner manifold, a fuel-gas-exhaust external manifold being attached to exhaust the fuel gas from the outlet of the fuel-gas-exhaust inner manifold.

3. The fuel cell of claim 2 wherein the oxidant gas channels extend across the first suffice of each gas separator and the first surface of the cooling plate.

4. The fuel cell of claim 3 wherein:

each gas separator and the cooling plate, respectively, have the fuel gas channels on the second surfaces, communicating with the fuel-gas-supply inner manifold and the fuel-gas-exhaust inner manifold at each end, respectively; and the fuel-gas-supply inner manifold and the fuel-gas-exhaust inner manifold are concavities on the second surface of each gas separator and the second surface of the cooling plate.

5. The fuel cell of claim 1 further comprising an electrolyte matrix between the electrodes of each cell unit and a plurality of first-electrolyte replenishing means for replenishing electrolyte to the electrolyte matrix of each cell unit, an opening for each first electrolyte replenishing means being formed on a side surface of the fuel cell where no external manifolds are attached.

6. The fuel cell of claim 5 wherein each of the first electrolyte replenishing means comprises:

a groove formed along an edge of the gas separator, one end of the groove being an opening formed on a side surface of the gas separator, the other end of the groove being a closing formed inside the gas separator; and sending means for sending the electrolyte to an innermost portion of the groove through the opening.

7. The fuel cell of claim 6 wherein the groove is formed on one of an upper edge and a lower edge seal of the gas separator, where the electrolyte is replenished to adjacent electrolyte matrix.

8. The fuel cell of claim 7 wherein the groove of the electrolyte replenishing means is further formed at one of an upper edge and a lower edge of the cooling plate.

9. The fuel cell of claim 8 wherein:

each gas separator and the cooling plate having the first electrolyte replenishing means includes second electrolyte replenishing means; and a groove of the second electrolyte replenishing means is formed on an edge opposing to the edge having the first electrolyte replenishing means, and the openings of the first electrolyte replenishing means and the opening of the second electrolyte replenishing means are formed on the opposing surfaces, respectively.

10. The fuel cell of claim 9 wherein a total of a length of the groove of each first replenishing means and a length of the groove of each second electrolyte replenishing means is substantially equal to or longer than a side of the gas separator.

11. The fuel cell of claim 7 wherein the sending means is a pipe extending to the innermost portion of the groove at one end.

12. A fuel cell in the form of a stack, comprising:

a plurality of cell units having first and second electrodes;

a plurality of gas separators; and at least one cooling plate having a plurality of cooling channels with cooling air inlets and cooling air outlets for carrying cooling air, the gas separators including first, second, and third gas separators, wherein each of the first gas separators is disposed between adjacent cell units, and the cooling plate is sandwiched by the second and third gas separators and disposed between adjacent cell units;

each first gas separator and the second gas separator, respectively, have a first surface that faces a first electrode of one of the cell units and is provided with oxidant gas channels, the oxidant gas channels being oriented to permit oxidant gas to flow in a direction perpendicular to the direction of cooling air flowing through the cooling plate; and each first gas separator and the third gas separator have a second surface that faces a second electrode of one of the cell units and is provided with fuel gas channels, a fuel gas-supply inner manifold for taking in a fuel gas and a fuel gas-exhaust inner manifold for releasing fuel gas having passed through the fuel gas channels, the fuel gas channels being oriented to permit fuel gas to flow in a direction parallel to the direction of the cooling air flowing through the cooling plates, each of the fuel gas-supply inner manifolds being disposed at a side of the respective separator corresponding to the side of the cooling air inlets and each of the fuel gas exhaust inner manifolds being disposed at a side of its respective plate corresponding to the cooling air outlets; and an inlet of the fuel gas-supply inner manifold and an outlet of the fuel gas-exhaust inner manifold being formed to supply and release the fuel gas in a same direction as the oxidant gas flowing through the oxidant gas channels.

13. The fuel cell of claim 12 wherein:

the stack is a hexahedron;

the inlet and the outlet of the cooling air channels in the cooling plate are formed on two opposed side surfaces excluding e top surface and a bottom surface, respectively, a cooling-air-supply external manifold being attached to the inlet side surface, a cooling-air-exhaust external manifold being attached to the outlet side surface; and an inlet and an outlet of the oxidant gas channels are formed on a part of each of the other two opposed side surfaces, respectively, and the inlet of the fuel-gas-supply inner manifold and the outlet of the fuel-gas-exhaust inner manifold being formed on a remaining part of each of the other two opposing side surfaces, respectively, each inlet and outlet being exposed from their respective side surfaces, an oxidant-gas-supply external manifold being attached to supply the oxidant gas to the inlet of the oxidant gas channels, an oxidant-gas-exhaust external manifold being attached to exhaust the oxidant gas from the outlet of the oxidant gas channels, a fuel-gas-supply external manifold and being attached to supply the fuel gas to the inlet of the fuel-gas-supply inner manifold, a fuel-gas-exhaust external manifold being attached to exhaust the fuel gas from the outlet of the fuel-gas-exhaust inner manifold.

14. The fuel cell of claim 12 wherein the oxidant gas channels extend across the first surface of each first gas separator and the first surface of the second gas separator.

15. The fuel cell of claim 14 wherein:

each first gas separator and the third gas separator have also the fuel gas channels on the second surface channel, communicating with the fuel-gas-supply inner manifold and the fuel-gas-exhaust inner manifold at each end, respectively; and the fuel-gas-supply inner manifold and the fuel-gas-exhaust inner manifold are concavities on the second surface of each first gas separator and the other surface of the third gas separator.

16. The fuel cell of claim 12 further comprising an electrolyte matrix between the electrodes of each cell unit and a plurality of first electrolyte replenishing means for replenishing electrolyte to the electrolyte matrix of each cell unit, an opening for each first electrolyte replenishing means being formed in a side surface of the fuel cell where no external manifolds are attached.

17. The fuel cell of claim 16 wherein each of the first electrolyte replenishing means comprises:

a groove formed along an edge of the gas separator, one end of the groove being an opening formed on a side surface of the gas separator, the other end of the groove being a closing formed inside the gas separator; and sending means for sending the electrolyte to an innermost portion of the groove through the opening.

18. The fuel cell of claim 17 wherein the groove is formed on one of an upper edge and a lower edge of the gas separator, where the electrolyte is replenished to adjacent electrolyte matrix.

19. The fuel cell of claim 18 wherein:

each gas separator having the first electrolyte replenishing means includes second electrolyte replenishing means; and the second electrolyte replenishing means is formed on an edge opposing to the edge having the first electrolyte replenishing means, and the openings of the first electrolyte replenishing means and the opening of the second electrolyte replenishing means are formed on opposing surfaces, respectively.

* * * * *